(12) United States Patent
Bussard et al.

(10) Patent No.: US 8,601,482 B2
(45) Date of Patent: Dec. 3, 2013

(54) DELEGATION METASYSTEM FOR COMPOSITE SERVICES

(75) Inventors: Laurent Bussard, Aachen (DE); Anna Wojtas, Nordrhein-Westfalen (DE)

(73) Assignee: Microsoft Corporation, Redmond, WA (US)

( * ) Notice: Subject to any disclaimer, the term of this patent is extended or adjusted under 35 U.S.C. 154(b) by 1282 days.

(21) Appl. No.: 11/934,443

(22) Filed: Nov. 2, 2007

(65) Prior Publication Data
US 2009/0119672 A1    May 7, 2009

(51) Int. Cl.
G06F 9/46 (2006.01)
G06F 9/44 (2006.01)

(52) U.S. Cl.
USPC .......................... 718/104; 717/120

(58) Field of Classification Search
None
See application file for complete search history.

(56) References Cited

U.S. PATENT DOCUMENTS

| | | | |
|---|---|---|---|
| 7,039,628 B2 | 5/2006 | Logan, Jr. | |
| 7,823,125 B2* | 10/2010 | Batabyal | 717/120 |
| 2002/0022973 A1 | 2/2002 | Sun et al. | |
| 2003/0023880 A1 | 1/2003 | Edwards et al. | |
| 2003/0078960 A1 | 4/2003 | Murren et al. | |
| 2004/0003139 A1* | 1/2004 | Cottrille et al. | 709/331 |
| 2004/0073530 A1 | 4/2004 | Stringer-Calvert et al. | |
| 2004/0172268 A1 | 9/2004 | Franklin et al. | |
| 2005/0125678 A1 | 6/2005 | Shaw et al. | |
| 2005/0216314 A1 | 9/2005 | Secor | |
| 2007/0027715 A1 | 2/2007 | Gropper et al. | |
| 2007/0136603 A1 | 6/2007 | Kuecuekyan | |
| 2007/0233703 A1* | 10/2007 | Hebert et al. | 707/10 |

OTHER PUBLICATIONS

Dillaway, et al., "Security Policy Assertion Language (SecPAL) Specification", Microsoft Corporation, 2007, pp. 51.
Foster, et al., "A Computational Framework for Telemedicine", available at least as early as Aug. 28, 2007, at <<http://66.102.1.104/scholar?hl=en&lr=&q=cache:LzhTEJusN78J:www.cs.luc.edu/users/gkt/papers/grid-computing/fgcs_1998_telemedicine.pd>>, pp. 24.
Gomi, et al., "A Delegation Framework for Federated Identity Management", ACM, 2005, pp. 94-103.
Kher, et al., "SGFS: Secure, Efficient and Policy-based Global File Sharing", available at least as early as Aug. 28, 2007, at <<http://www.dtc.umn.edu/publications/reports/2006_08.pdf>>, pp. 12.
Ni, et al., "Privacy-aware Role Based Access Control", at <<http://delivery.acm.org/10.1145/1270000/1266848/p41-ni.pdf?key1=1266848&key2=9110828811&coll=GUIDE&dl=GUIDE&CFID=33168465&CFTOKEN=70810810>>, ACM, 2007, pp. 41-50.

(Continued)

*Primary Examiner* — Kenneth Tang
(74) *Attorney, Agent, or Firm* — Zete Law, P.L.L.C.; MacLane C. Key

(57) ABSTRACT

A delegation metasystem for composite services is described, where a composite service is a service which calls other services during its operation. In an embodiment, the composite service is defined using generic descriptions for any services (and their access control models) which may be called by the composite service during operation. At run time, these generic descriptions and potentially other factors, such as the user of the composite service, are used to select actual available services which may be called by the composite service and access rights for the selected services are delegated to the composite service. These access rights may subsequently be revoked when the composite service terminates.

16 Claims, 11 Drawing Sheets

(56) References Cited

OTHER PUBLICATIONS

Pearlman, et al., "A Community Authorization Service for Group Collaboration", at <<http://ieeexplore.ieee.org/iel5/7903/21795/01011293.pdf?isnumber=21795&prod=STD&arnumber=1011293&arnumber=1011293&arSt=50&ared=59&arAuthor=Pearlman%2C+L.%3B+Welch%2C+V.%3B+Foster%2C+l.%3B+Kesselman%2C+C.%3B+Tuecke%2C+S.>>, IEEE, 2002, pp. 10.

"SeCSE Service Centric System Engineering", Information Society Technologies, pp. 51.

\* cited by examiner

DELEGATION METASYSTEM FOR COMPOSITE SERVICES

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Composite services are services which are built upon other services, such that when the composite service runs, it calls those other services. In order to be able to call those other services, composite services either have to run within a single trust domain or the composite service must include access control mechanisms to enable authentication with services in other domains. Restricting a composite service to operate within a single trust domain limits the scope and applicability of such a service, whilst including access control mechanisms increases the complexity of the complex service. Additionally, where either the service called by the composite service changes, or the access control details change, it is necessary to update the composite service.

The embodiments described below are not limited to implementations which solve any or all of the disadvantages of known composite services or composite service systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A delegation metasystem for composite services is described, where a composite service is a service which calls other services during its operation. In an embodiment, the composite service is defined using generic descriptions for any services (and their access control models) which may be called by the composite service during operation. At run time, these generic descriptions and potentially other factors, such as the user of the composite service, are used to select actual available services which may be called by the composite service and access rights for the selected services are delegated to the composite service. These access rights may subsequently be revoked when the composite service terminates.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
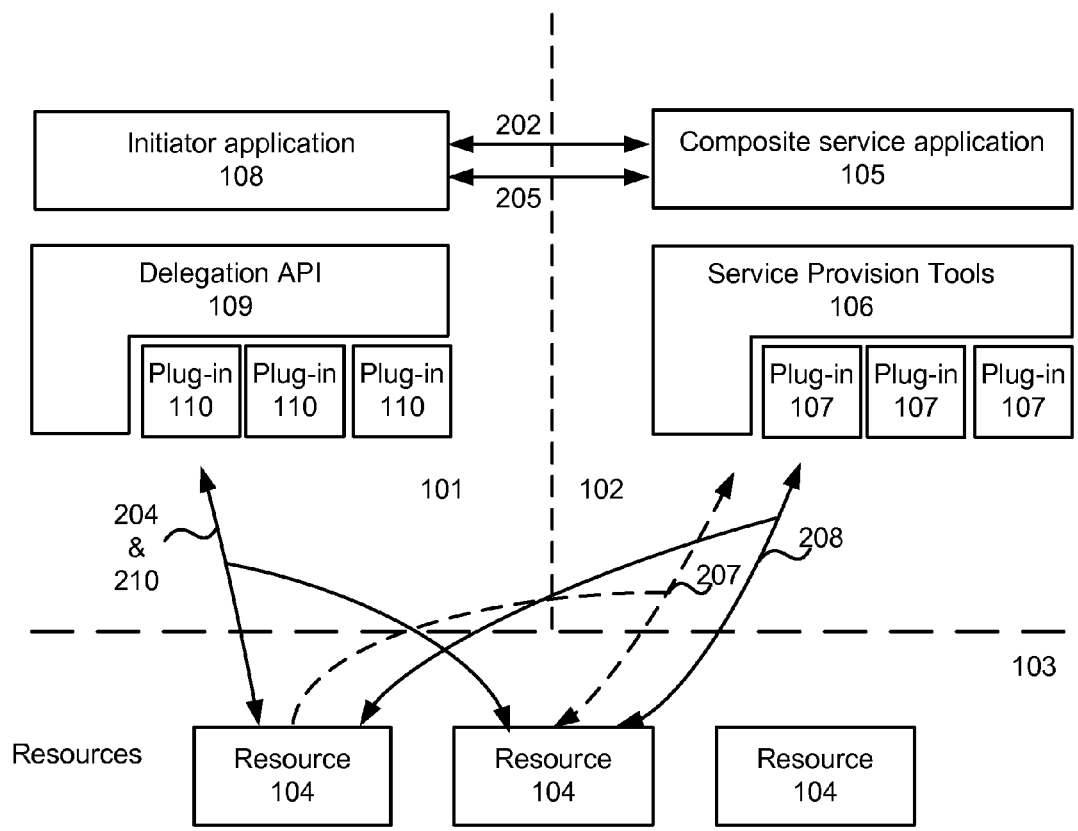
FIG. 1 is a schematic diagram of an example delegation metasystem.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, composite services are services which are built upon other services, such that when a composite service is run, it calls those other services. These services accessed by the composite service may be referred to as 'resources' and the resources called by a composite service may include a web service, a web page, a file sharing service, a database, a data object in a storage system etc. In order that a composite service can access a particular resource, the composite service and the resource may be located within the same trust domain. Where the composite service is not in the same trust domain as the resource, the composite service requires authorization to access the resource and this may be achieved using the access control model for the particular resource.

Whilst the access control details and instructions may be included within a composite service design time, in some applications, the particular resources which are to be called by the composite service are not known when the composite service is designed. This may be because the choice of particular resource is dependent upon a user of the composite service or because the choice of particular resource is dependent on another variable, such as the location of the user, the time of day, the day of the week etc. In another example, the resource cannot be known because it may not have been created at the time when the composite service is designed.

Methods and systems are described below in which the resources required by a composite service are defined generically at design time. At run time (of the composite service), the actual resources to be used are identified based on the generic definitions, i.e. at run time the generic resources may be mapped to concrete resources. Authorization to access a resource is delegated at run time to the composite service, where required, using appropriate plug-in to set access rights. The composite service may select and use an appropriate access control model plug-in in order to access the resource.

There are many different applications for the methods and systems described herein and a number of examples are described below. In an example situation, a satellite navigation system may propose the use of a discovered sightseeing service to occupants of a vehicle in which the satellite navigation system is installed. The sightseeing service (the composite service) may be triggered from the satellite navigation system (the initiating application) and may require some rights, such as access to the user's location, the audio system in the vehicle and any user preferences (all of which comprise the resources) in order to provide the sightseeing service. The rights required by the sightseeing service are dependent upon many factors, such as the user, the user's location positioning system, the user's car etc, which could not have been defined at the time the sightseeing service was designed and are likely to be different for different users of the sightseeing service.

FIG. 1 is a schematic diagram of an example delegation metasystem, which may be considered to be divided into three logical parts: the initiator (or delegator) part 101, the composite service (or delegatee) part 102 and the resource part 103. The term 'metasystem' refers to a system of systems. The metasystems described herein provide a unified layer which abstracts other delegation systems. The resource part 103 comprises a number of resources 104. Each resource 104 offers a service, which may be a web service, access to a data object in a storage system or any other kind of service. The composite service part 102 comprises the composite service application 105 (or composite service) which requires access to a resource and a service provision tools element 106 which is used to express the composite service's requirements and to access resources. The resources are accessed using one of the plug-ins 107, where the plug-ins use received credentials to authenticate with a resource and may correspond to specific resources and/or to different access control models. The composite service may also be referred to as the delegatee service.

The initiator side 101 comprises the initiator application 108 (or initiator service) which controls access to resources and the delegation API 109 which grants and revokes access to delegatees (i.e. to composite services). The delegation API 109 also comprises a number of plug-ins 110 which map the abstract delegation to concrete underlying access control models and correspond to different access control models and/or to specific resources. For instance plug-ins can be defined to configure a Security Token Service, to create a chain of credentials, to modify an access control list, to define a new username-password, etc. A plug-in 110 may be highly configurable (e.g. using domain specific languages) in order to be able to support multiple access control models or a plug-in 110 may be very specific. In an example of use of specific plug-ins, different plug-ins may be required to give access to two different calendars based on username and password but through different management interfaces.

Figure 2:
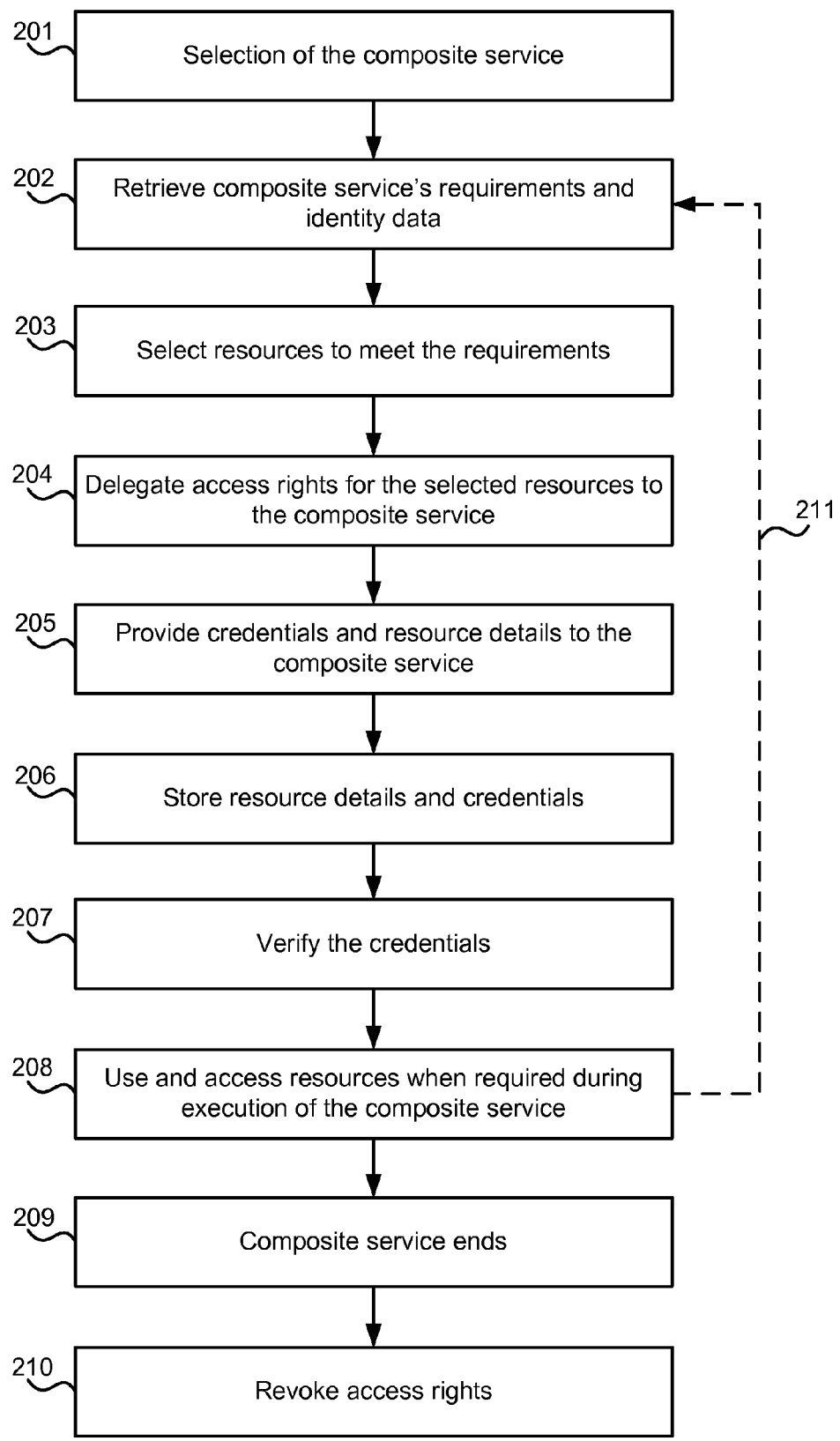
FIG. 2 is a flow diagram of an example method of operation of a delegation metasystem.

The operation of the system of FIG. 1 can be described with reference to the flow diagram shown in FIG. 2. Arrows in FIG. 1 are numbered to correspond to method blocks in FIG. 2 and whilst the arrows are shown as double ended, the information flow in a particular method block may be unidirectional or bidirectional. On selection of the composite service (block 201), the composite service's requirements and identity data are retrieved (block and arrow 202). The composite service may be selected by the initiator application 108 and this may be triggered by an event within the application or a user input. The requirements and identity data may be retrieved from the composite service application 105 (as shown in FIG. 1) or from a data store which may be stored anywhere which is accessible by the initiator application 108 (e.g. via a web server). The requirements may be contained within metadata associated with the composite service. The identity may comprise an X.509 certificate, a username (or service name) or any other means of identifying the composite service.

Having receiving the requirements (in block 202), resources are selected to meet those requirements (block 203). This selection may be performed by the initiator application 108. Selection may be based on discovery, local configuration or a central resource list and the selection may be based on factors such as the user of the composite service, the location of the user, the time of day or any other factor. The resources may be selected from a set of resources for which the initiator application has the right to delegate access. If the resources are selected from a set which includes resources for which the initiator application does not have the right to delegate access, another entity which does have such delegation rights may be used in the method to delegate the required rights either directly to the composite service or by delegating delegation powers to the initiator application. In some situations there may be fixed correspondence between requirements and resources and it may not be necessary to consider any variables, such as those listed above.

Access rights to the selected resources are then delegated to the composite service (block and arrow 204). This may be performed by the delegation API 109 and in order to communicate with and delegate rights for a selected resource, a plug-on 110 which corresponds to the access control model used by the selected resource may be used. Examples of this delegation process using different access control models are described in more detail below. Where the plug-ins 110 correspond to specific resources, the plug-in may be selected which corresponds to the selected resource. In performing the delegation, access credentials may be generated for the composite service. These credentials may be a username and password, an X.509 certificate or any other form of credential. The credential may comprise a reference to a credential which is already known by the composite service, for example the X.509 certificate of the composite service and associated private key. In another example, where the access to a resource is by means of an access list maintained by the resource, the credential may comprise confirmation of the username of the composite service (which may be the same as that provided by the composite service in block 202) that should be used in accessing the resource.

The access credentials are provided to the composite service along with details of the resource they relate to (block and arrow 205). These may be provided when the composite service is launched or their provision may cause the composite service to be launched. In another example, credentials and resource details may be provided during the running of the composite service, and this example is described in more detail below. The details of the resource to be used by the composite service may comprise a resource name, an address of the resource (e.g. an IP address) or any other means by which the composite service can identify and contact the resource.

On receipt of the resource details and the credentials (in block 205), this information is stored (block 206) and this may be performed by the service provision tools 106. The resource details and credentials may be stored within the service provision tools 106 or within a data store elsewhere. The composite service may check that the credentials provided enable the composite service to access the identified resource (block 207) and this may be performed by the service provision tools 106. The verification may be performed in a number of different ways and at differing levels of complexity. In a first example, the composite service may only check that the received credential maps the access control model of the resource. This enables the composite service to select the correct one of the plug-ins 107. In a second example (as indicated by dotted arrow 207), the composite service may verify that the credential will give it access to the identified resource. This verification may be performed without actually accessing the resource (or invoking the resource where the resource is a service). This may involve querying the resource, where the response supports such queries about credentials which are received from composite services.

Having received and stored the resource details and corresponding credentials (in blocks 205 and 206), the resources can be accessed as required during the execution of the composite service (block and arrow 208).

In many examples, all the resources required by a composite service will be identified and mapped to concrete resources (i.e. actual resources) initially after the composite service is selected (in block 201); however in some examples, the resources may not all be initially determined and mapped to concrete resources. This may be because there are a large number of resources required by the composite service but not all are required immediately or because the resources required by the composite service may change and therefore all the requirements may not be known on selection of the service. This may be particularly applicable to interactive composite services where actions of the user may result in further resource requirements being identified. An alternative would be to map and delegate access for all possible resource requirements of the interactive composite service however this may result in delay in launching the composite service (whilst access to all the resources is delegated) and in access being granted to large numbers of resources which are then not subsequently accessed by the composite service.

In an example, a sightseeing service (as the composite service) may offer many services, such as providing details of museums, galleries and other points of interest, details of restaurants, bars and cafes, details of hotels, details of airports etc. When a user starts a sightseeing tour, the composite service will not know when and if the user will want to break for refreshments and therefore the trigger for the requirements for the service providing details of restaurants, bars and cafes may be a user input indicating that they desire a refreshment break. At this point in the composite service, the new requirements may be retrieved and aspects of the method repeated (as indicated by dotted arrow 211), or where no requirements were initially retrieved, the method of FIG. 2 may continue (with block 202). In this example, the delegation metasystem may be triggered by a static attribute of the composite service (delegatee) exposed as metadata. However, it is also possible to have more dynamic interactions between delegatee and delegator where the delegatee requests access to a service during its execution. Delegator-driven scenarios where the delegator provides some access rights to a delegatee without prior request are also supported by the delegation metasystem.

When the composite service ends (block 209), the access rights delegated to the composite service are revoked (block and arrow 210). The revocation may be performed by the delegation API 109 and examples of this method step are described in more detail below. In some examples, the revoking of the access rights may not be triggered by a specific request from the delegation API 109 (or other entity associated with the initiator application 108), but may be triggered by another event, which may, for example, be linked to a time delay (e.g. the composite service is granted access for a predefined period of time), the number of times the resource is called (e.g. the composite source is able to call the resource a predefined number of times) or any other criteria. In an example, the composite service may only be permitted to call a resource once and on completion of the execution of the service provided by the resource, access rights may be revoked. In this example, the credentials may comprise a certificate which is only valid for a single invocation of the service.

Aspects of the method and system are described in more detail below along with example applications for the method and system.

The method and system described above simplify the design of both the composite service application 105 and the initiator application 108. Neither application needs to include specific details of the resources that are required but instead generic requirements can be defined (e.g. in metadata). Details of access control models need not be included within the applications as these are addressed by plug-ins 107, 110 within the service provision tools 106 and delegation API 109 respectively. A service designer does not need to know the particular resources which will be used when the composite service is run or the access control models which each of the resources use. The resources are allocated at runtime and a plug-in is selected for each resource to correspond to the required access control model. In some example applications, it is not possible for the designer to know which resources will be required at runtime, e.g. where the resource is a mobile telephone service which is selected dependent on the location of the user or where the resource is a hospital record which is selected dependent upon the actual user, and potentially also other factors such as the health insurance provider of that user and the hospital in which the user is being treated.

The method and system described above enables event driven delegation of access rights to composite services. In some examples, a user may be able to access details of what rights have been delegated to particular composite services. Furthermore, as the resources are selected at runtime, the resource selection may be tailored to the specific situation, rather than a composite service having to use a more general resource which was known at design time, but cannot take into consideration any event specific factors (e.g. user, location, time of day etc).

By allocating the resources at runtime, the composite service does not require updating every time a resource changes. The composite service is also more resilient because it can adapt to changes in availability of resources. In an example where one of the resources fails or otherwise becomes unavailable, an alternative resource may be selected (e.g. in block 203).

The use of plug-ins 107, 110 to handle the different access control models enables additional access control models to be added to the initiator side 101 and the composite service side 102 as required. If a new (and possibly improved) access model is developed which may be used by one or more of the possible resources, additional plug-ins for the new access model may be added to both the initiator side 101 and the composite service side 102. The systems and methods described herein may therefore be adaptable, upgradeable and future-proofed.

The above description refers to metadata attached to (or relating to) a composite service which defines the resource requirements of the particular composite service. The metadata may also include the identity details for the particular composite service. Resources may also have metadata attached to (or relating to) them. The resource metadata describes the way in which access to the resource may be delegated. This may be used by the delegation API in delegating access rights (in block 204) and in some cases it may also be used by the service provision tools in verification of the credentials received (in block 207). Whilst part of the verification may be based on the metadata, it may involve a specific request to the resource to check whether received credentials will be sufficient for subsequent access (as described below). Use of such resource metadata is described below, for example with reference to FIGS. 6-10.

The delegation API 109 may perform some or all of the following four different actions:
 granting rights,
 revoking rights,
 renewing rights, and
 obtaining current delegation status.
The delegation API 109 may also perform additional functions not described here. In some examples, the delegation API may perform the mapping between the resource requirements identified for the composite service and the actual resources to be used. However, the following description is written for the example situation where the mapping (block 203) is performed by the initiator application 108.

In order to grant access to a resource (i.e. to delegate rights) the delegation API receives details of the composite service to which the rights are to be delegated. These details, which may be received from the initiator application 108 and may have been retrieved from the composite service in block 202, identify the composite service and may comprise the service's name, X.509 certificate, an email address or other identification data. The delegation API also receives (e.g. from the initiator application) details of the resource (or resources) to which access is to be granted. The resource has been previously selected (in block 203) on the basis of the resource requirements identified by the composite service (and accessed in block 202). The resource may be identified by its service address, by an action (e.g. the function call which is required to invoke the resource) or any other means. Where the resource is a method running on a web server, the resource may be identified by the instruction used to call the method. Depending on the granularity required, the resource identifier may include extra information to identify to part of the resource to which access is required; for example, where the resource is a hospital record for a user, the resource may be identified by the address of the server holding the records and the name of the user. In addition, in some examples the resource identifier may include additional information. These inputs to the delegation API 108 may be received from the initiator application 108.

The outputs from the delegation of rights are the resource identifier and the credential associated with the particular resource. The resource identifier may be the same as that provided to the delegation API (as described above) and in which case it may not be necessary for the delegation API to output this information. In other examples, the resource identifier may include additional information, such as a parameter value, to enable the composite service to correctly call the resource. The credential may be a new credential, such as a Security Assertion Markup Language (SAML) token or a reference to a credential already known by the composite service to which the right is to be delegated (e.g. the composite service's X.509 certificate). The outputs may be provided directly to the composite service or may be provided to the initiator application 108 for forwarding to the composite service (as in block 205).

In order to revoke access to a resource (i.e. to revoke a delegated right) the delegation API 108 receives an identifier for the delegatee, i.e. the composite service to which the rights were granted, and the resource identifier. The identifier for the composite service and the resource identifier may be the same as those described above and the information provided in order to revoke rights may be the same information as was provided to grant the rights.

In order to renew rights to a resource, the delegation API 108 may receive the same information as provided when the initial granting of the rights were requested (i.e. the resource identifier and the composite service identifier) or the same information as output by the delegation API on granting of the rights (i.e. the resource identifier and the credential). In another example, all of this information may be provided (i.e. the resource identifier, the composite service identifier and the credential). The renewal process may be substantially similar to the process of granting the rights and may output a new credential or a reference to an existing credential.

A fourth action which may be performed by the delegation API comprises providing information on the current delegation status. This information may be provided to a user (e.g. via a user interface (UI) which may be provided by the initiator application), an application (such as the initiator application), a resource or to a third party. In response to a request to obtain the current delegation status, the delegation API 108 provides a list of resources and their delegatees. The delegation API may be provided with details of a user, a resource or a composite service in order to filter the output list, e.g. to provide details of all rights relating to a particular user which have been delegated, all rights delegated to a particular composite service or all delegatees for a particular resource. In other examples, different or additional filter conditions may be provided.

In obtaining the current delegation status, the granularity and details regarding a chain of delegation will depend on the available information which in turn may depend on the particular access control mechanism used for a resource. The querying of delegation status may be performed in response to a user request, e.g. a user querying who currently has rights to see their medical records, and may result in a user initiating the revoking of rights (e.g. as described above).

Figure 3:
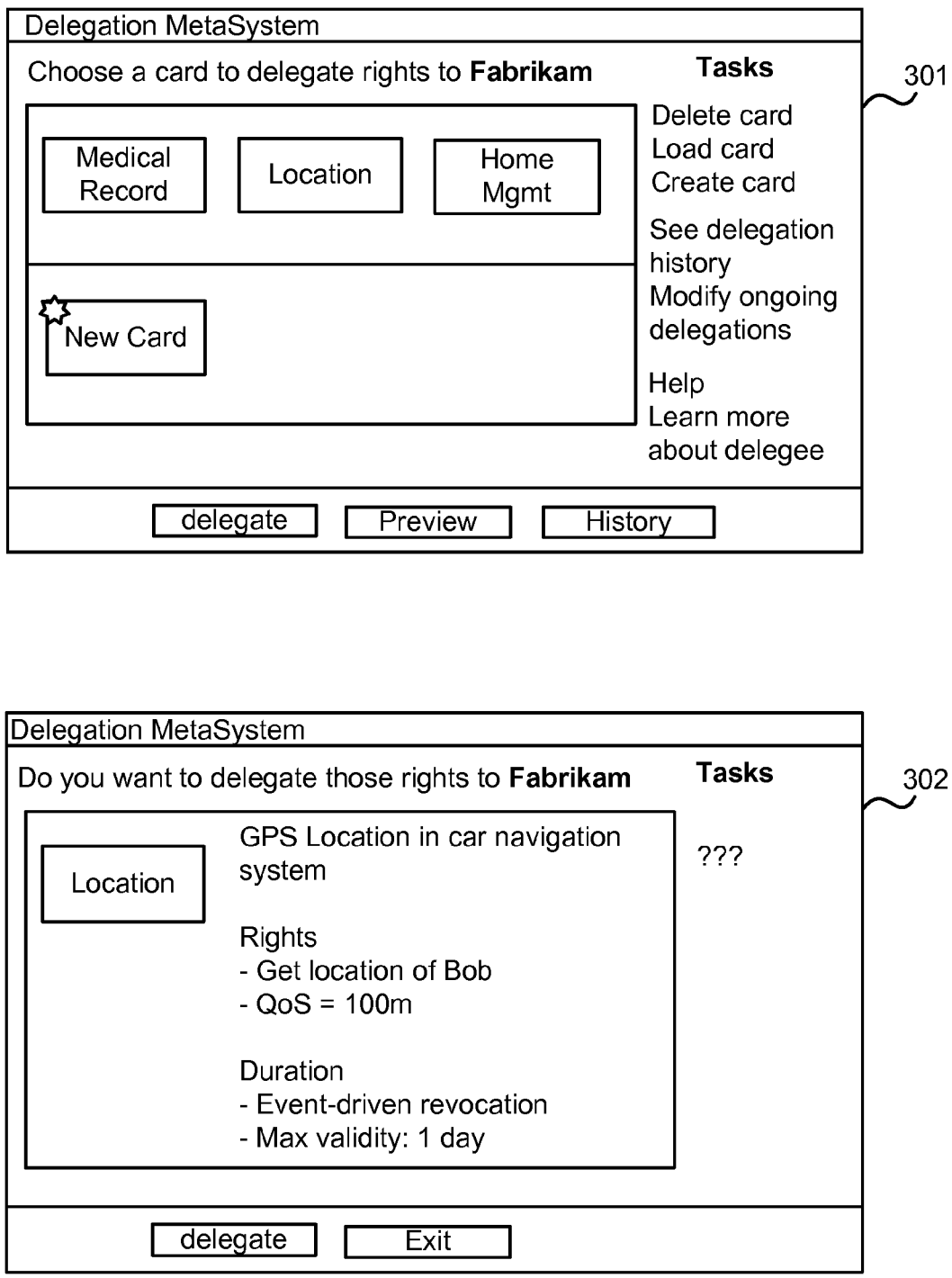
FIGS. 3 and 4 show three example screens from a delegation user interface.
Figure 4:
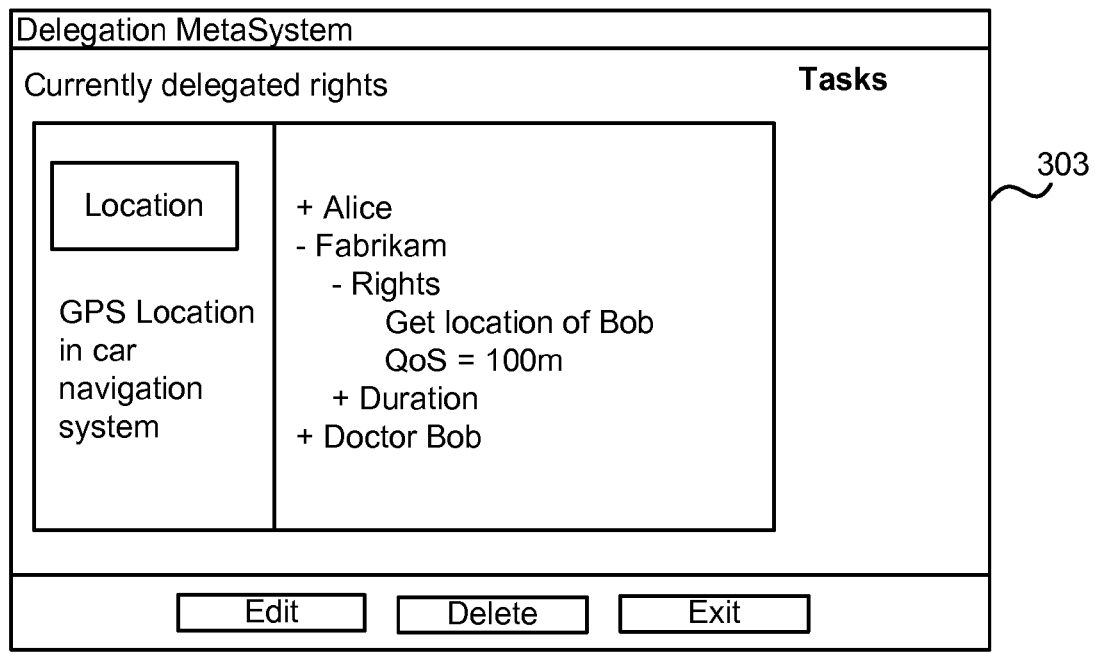

The initiator side 101 may comprise a delegation UI associated with the delegation API 109. In some examples, the delegation UI may be included within the initiator application 108. The delegation UI provides a generic UI on top of the delegation API which may enable one or more of the following user actions:
 selection of resources based on a composite service's requirements;
 querying current delegation status of resources where access is controlled by the user; and
 changing or revoking existing access rights.
FIGS. 3 and 4 show three example screens from the delegation UI which show selection of a right to delegate (screen 301), granting an access right (screen 302) and querying delegation status for a particular resource (screen 303). In other examples, the delegation UI may enable different user actions in addition to, or instead of, those described above.

Figure 5:
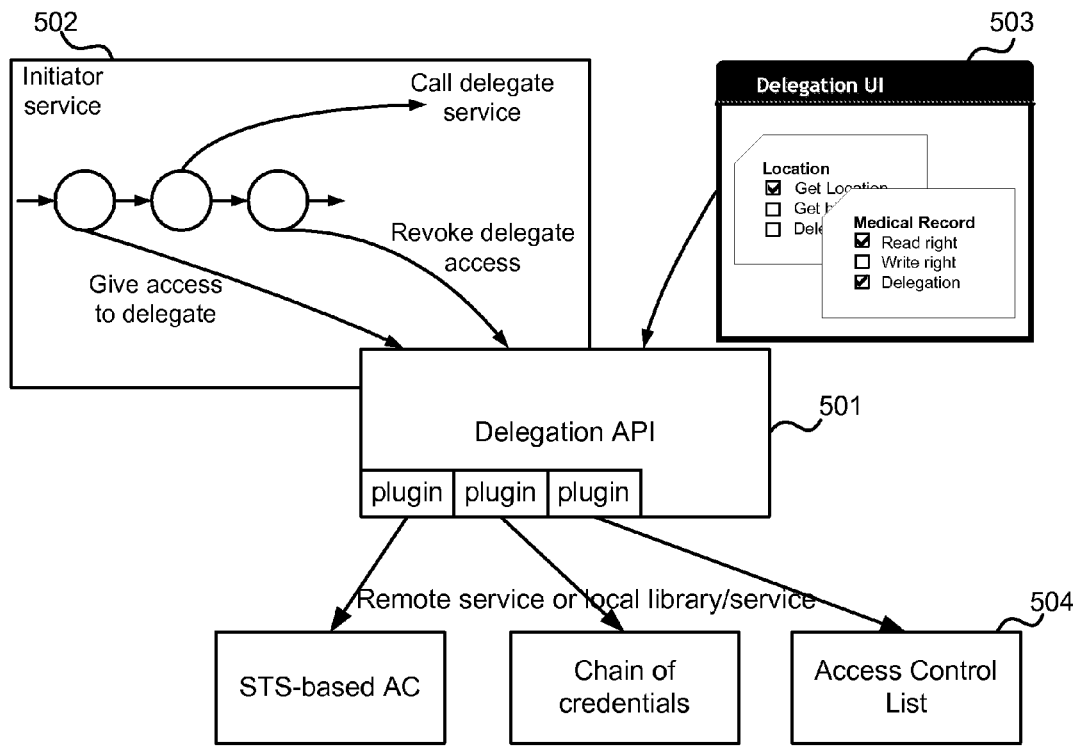
FIG. 5 shows a schematic diagram of an example of the interaction between elements in the delegation metasystem.

FIG. 5 shows a schematic diagram of an example of the interaction between the delegation API 501, the initiator service 502, the delegation UI 503 and a number of resources 504. The initiator service 502 initially gives access to a delegatee (i.e. a composite service) by interacting with the delegation API 501, which in turn interacts with the resources 504. The delegation UI 503 may be used in selecting the resource to delegate rights to or alternatively may provide an indication of those rights which have been delegated. After rights have been delegated, the composite (or delegatee) service can be called. On termination of the composite service, the access rights are revoked, again through interaction between the initiator service 502, the delegation API 501 and the resources 504. Any change in access rights will be reflected in information displayed by the delegation UI 503. It will be appreciated that this provides just one example of the interaction and in other examples, the composite service may already be running (as described above) and the revocation of access rights may be triggered by a different trigger event.

Figure 6:
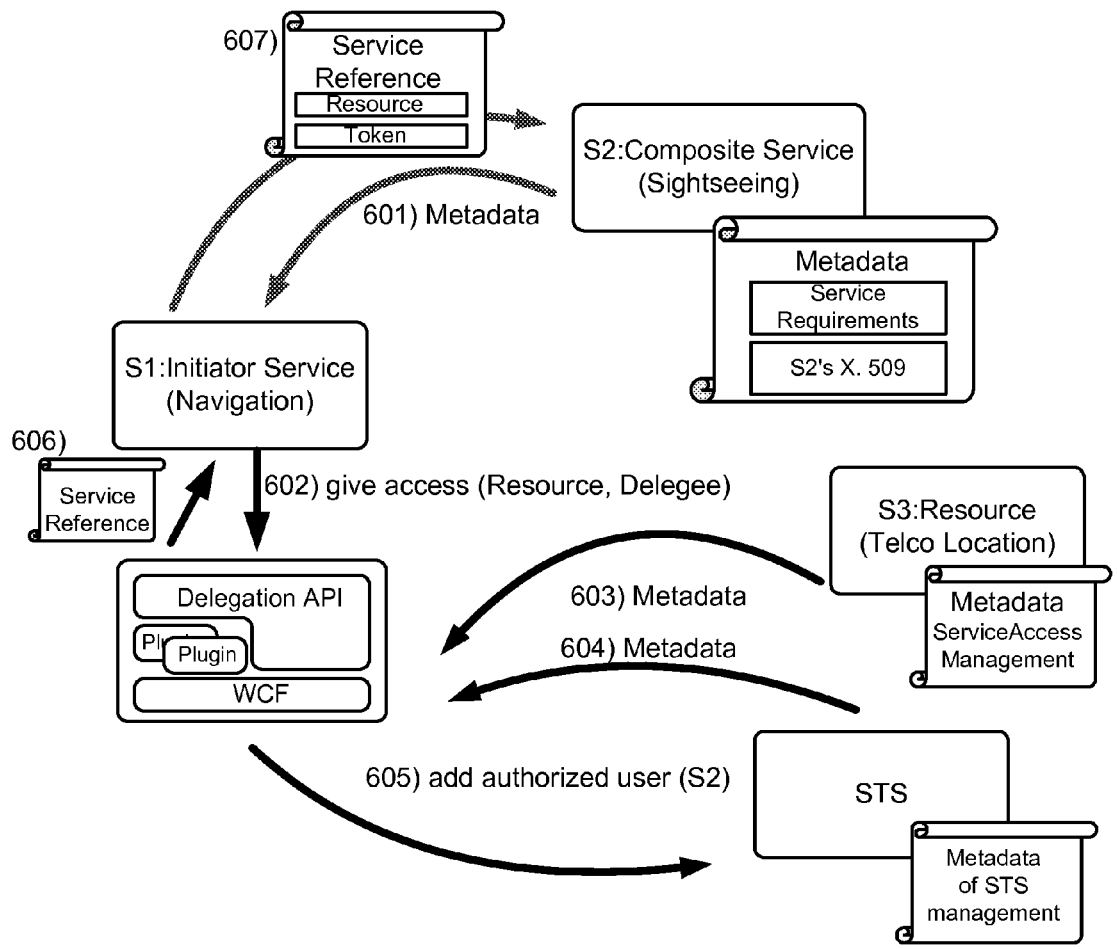
FIGS. 6 and 7 show schematic diagrams of the process of delegation of rights in more detail.
Figure 7:
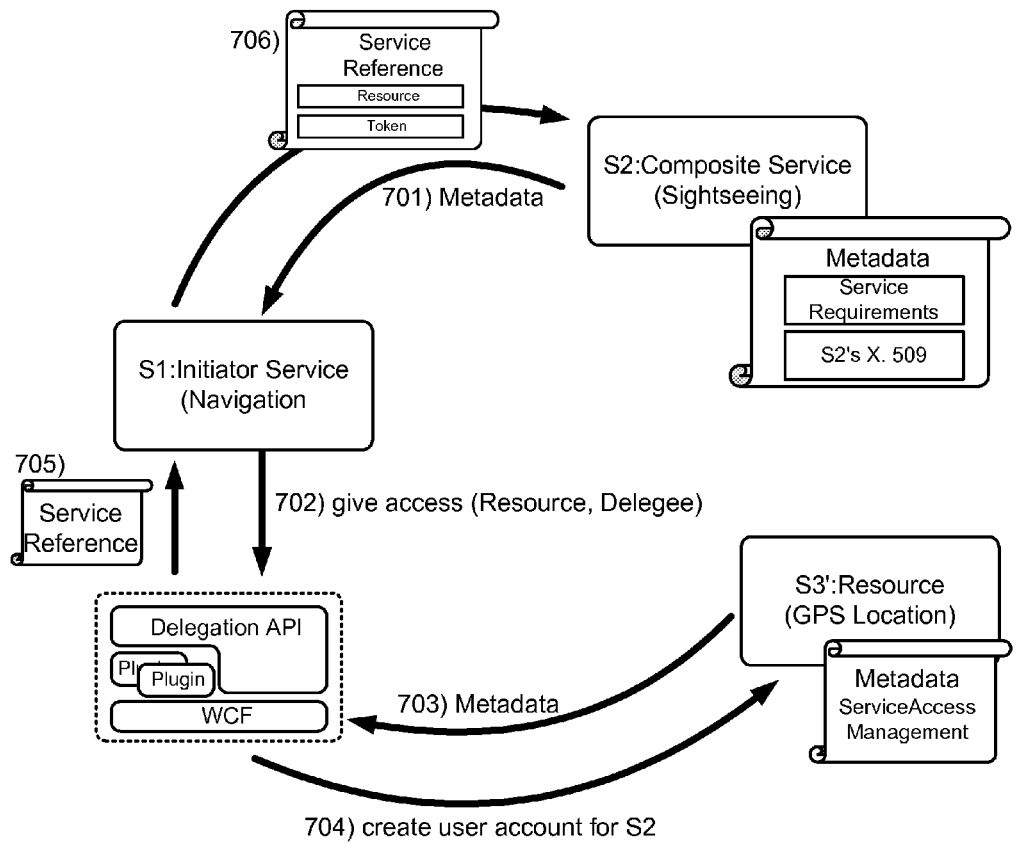

FIGS. 6 and 7 show the process of delegation of rights in more detail (i.e. blocks 201-205 in more detail). In the example of FIG. 6, the delegation of rights results in the configuration of a security token service (STS), for example by adding the public key of a composite service into the access control list in the trust domain of a resource. In the example of FIG. 7, the delegation results into the creation of a new user account for the composite service (the delegatee). The new username and password are passed as a security token to the delegatee.

In the example shown in FIG. 6, an initiator service S1 (which may be a workflow) lets a delegatee service S2 (the composite service, which may also be a workflow) access a resource S3, which is protected by an STS requiring X.509 authentication. Initially (arrow 601), the initiator retrieves the composite service's resource requirements (referred to as 'service requirements' in FIG. 6, e.g. location service and audio service) and the composite service's identity (e.g. X.509 certificate). A resource is chosen based on the service requirements and, as described above, selection may be based on discovery, local configuration, or a central resource list. The Delegation API is used to define that the composite service can access a selected resource (arrow 602). Metadata of the resource is retrieved to find the access control model used by the resource, and in this example, to obtain the management endpoint (arrow 603). In this example, the management endpoint is the management interface of an STS. The metadata associated with the STS is used to define how the Delegation API authenticates to the STS's management interface and how the configuration can be changed (arrow 604). The appropriate plug-in is selected to proceed with the delegation (arrow 605), i.e. configuration of the STS in this example. The resource and the security token (a reference to the composite service's X.509 certificate) are returned to the initiator service (arrow 606) and provided to the composite service (arrow 607), thereby enabling the composite service to access this resource.

In the example shown in FIG. 7, the same initiator service S1 lets the same composite service S2 access a different resource S3', which has an access control mechanism based on a username and password. S1 and S2 may be the same as those in the example of FIG. 6. The description of delegation, revocation, and service call do not change but are mapped at runtime to other mechanisms, as described below.

The initiator obtains (arrow 701) the resource requirements (e.g. location service and audio service) and the identity of the composite service (e.g. an X.509 certificate). The resource is chosen based on the resource requirements of the composite service and as described above selection may be based on discovery, local configuration, a central resource list, etc. The Delegation API is used to delegate access rights such that the composite service can access the selected resource (arrow 702). Metadata of the resource is retrieved to find the access control model (arrow 703). In this example, the management endpoint is part of the resource and therefore no separate management endpoint is obtained. The appropriate plug-in is then selected to proceed with the delegation, e.g. to create a new user account in this example (arrow 704). The resource and the security token (e.g. new username and password) enabling the composite service to access this resource are returned (arrow 705) and are provided to the composite service (arrow 706).

The initiator service S1 and composite service S2 in FIGS. 6 and 7 described above may be the same in both examples.

The abstraction is achieved by hiding the concrete access control model and associated way to delegate and revoke access rights. Apart the two mechanisms described above, other examples may provide mappings to other access control mechanisms including, but not limited to, chain of credentials, multiple STS settings, or role-based access control.

Figure 8:
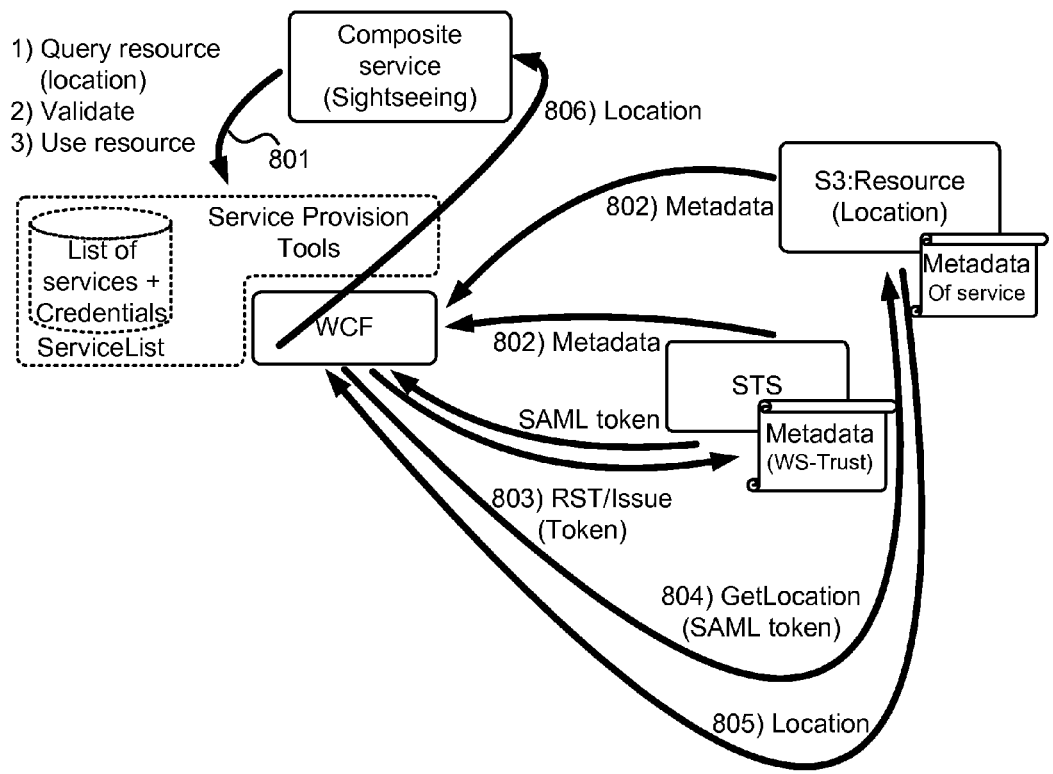
FIG. 8 shows a schematic diagram of how a composite service uses the credential and resource identifier it receives.

FIG. 8 shows a schematic diagram of how a composite service uses the credential and resource identifier which it receives from the initiator (e.g. as shown in FIG. 6 or 7). Having received the resource identifier and associated credential (such as a security token) and stored them, the composite service queries the resource identifier and credential (arrow 801). Based on resource metadata (and STS metadata in this example), the composite service verifies that the received token does map the resource requirements of the composite service (arrows 802) and then accesses the resource (arrow 803), e.g. the composite service calls a web service (where the resource is a web service). The service provision tools may be used to call the service in combination with Windows Communication Foundation (WCF) (arrows 804 and 805) and the result is returned to the composite service (arrow 806). As in the delegation examples of FIGS. 6 and 7, the composite service (delegatee), which accesses the resource, is not affected by the underlying access control model.

Figure 9:
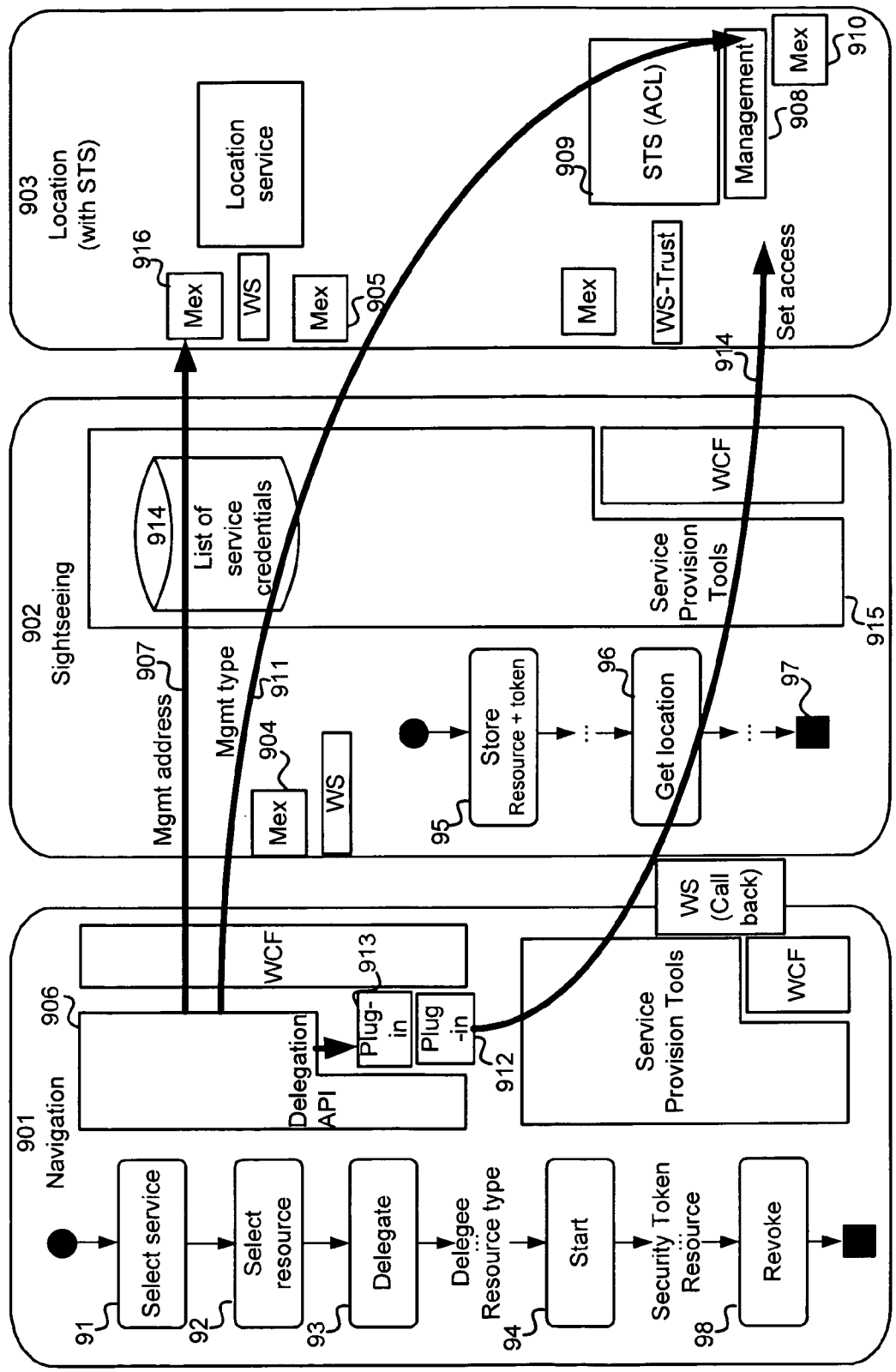
FIGS. 9 and 10 show schematic diagrams of further example delegation metasystems.

FIG. 9 shows a schematic diagram of a further example delegation metasystem which may be used to illustrate the navigation example described above. In this example, a satellite navigation system 901 (the initiating service) may be used to provide a sightseeing service 902 (the composite service) to occupants of a vehicle (the users) in which the satellite navigation system is installed. The resources required include a location service 903, to enable the sightseeing service to know the user's location. Other resources may also be required (e.g. an audio service within the car) but for purposes of explanation only, only one resource is shown and described. Whilst the following description refers to particular embodiments of initiating service, composite service and resource, the system and methods described are applicable to any initiating service, composite service and resource.

When the sightseeing service is selected by the navigation system (block 91), either automatically or in response to a user input, the navigation system accesses metadata 904 relating to the sightseeing service. The metadata may be stored associated with the service (as shown in FIG. 9) or may be stored elsewhere. Resources are then selected (block 92) by the navigation system based on the metadata received about the sightseeing service (in block 91) and also based on metadata 905 associated with resources known to the navigation system. Whilst in the example shown in FIG. 9, the navigation service accesses the metadata 905, in other examples copies of the metadata for known resources may be stored at the navigation service and this metadata may be periodically synchronized with the resources. In other examples, the resource selection may be performed by the navigation service based on locally stored information and then the metadata for selected resources may be accessed to verify that the selected resources can meet the requirements of the sightseeing service as defined in its associated metadata. In this example location service 903 is selected.

Access rights to the location service are then delegated to the sightseeing service 902 (block 93). This delegation involves the delegation API 906 being provided with details of the delegatee (the sightseeing service) and the resource (the location service) and the delegation API then communicates with the location service to identify the access control details (arrow 907), for example to identify the management address for the location service. This communication may result in the delegation API identifying that another resource needs to be used in the delegation of access rights and this may be dependent upon the particular access control model used, e.g. where the management address (also referred to as management endpoint) refers to the management interface 908 of an STS 909 (in a corresponding manner to that shown in FIG. 6 and described above). In the example shown, having received the management address (arrow 907), the delegation API accesses metadata 910 associated with the management interface 908 of the STS 909 to identify the access control model (or management type) used by the STS (arrow 911). Based on this metadata 910, the delegation API selects an appropriate plug-in 912 (arrow 913) to use in communicating with the STS management interface 908 to set the access rights for the sightseeing service (arrow 914). This communication results in a concrete management action on the STS, such as adding the X.509 certificate of the sightseeing service to an access control list for a particular action (e.g. 'find location' for a particular identified user).

When the sightseeing service is launched (block 94), details of the location service and a security token for the location service are provided to the sightseeing service. The sightseeing service then stores the information in a local cache or other memory (block 95), for example in a list of services and credentials 915 within the service provision tools 916. When subsequently during execution of the sightseeing service, the location of the user is required (block 96), the details of the location service and the security token are accessed from the list 915 and communicated to the location service and the STS. This may use WCF protocols in order to authenticate the sightseeing service and gain access to the location service.

Once the sightseeing service ends (block 97), the access rights granted to the service are revoked (block 98) and this may be done through the management interface 908 of the STS. The communication in order to revoke the rights may be similar to those described above in order to grant the rights. Based on a security token and resource identifier provided to the delegation API, the API retrieves metadata 916 associated with the location service to identify a management address (in a corresponding manner to arrow 907). From this management address the use of the STS is identified and therefore metadata 910 associated with the management interface 908 is accessed to identify the appropriate access control model to use (as in arrow 911). A plug-in is then selected and used to communicate with the management interface in order to revoke the granted rights.

Whilst in the example shown in FIG. 9, there is a correlation of the manner in which access rights are granted and the way in which access rights are revoked, in other examples there may be no such correlation and the two processes (granting rights and revoking rights) may proceed differently. For example, access rights may be granted by creating a new username and password and then the access rights may subsequently be revoked by adding the composite service (i.e. the particular username) to a revocation list.

Figure 10:
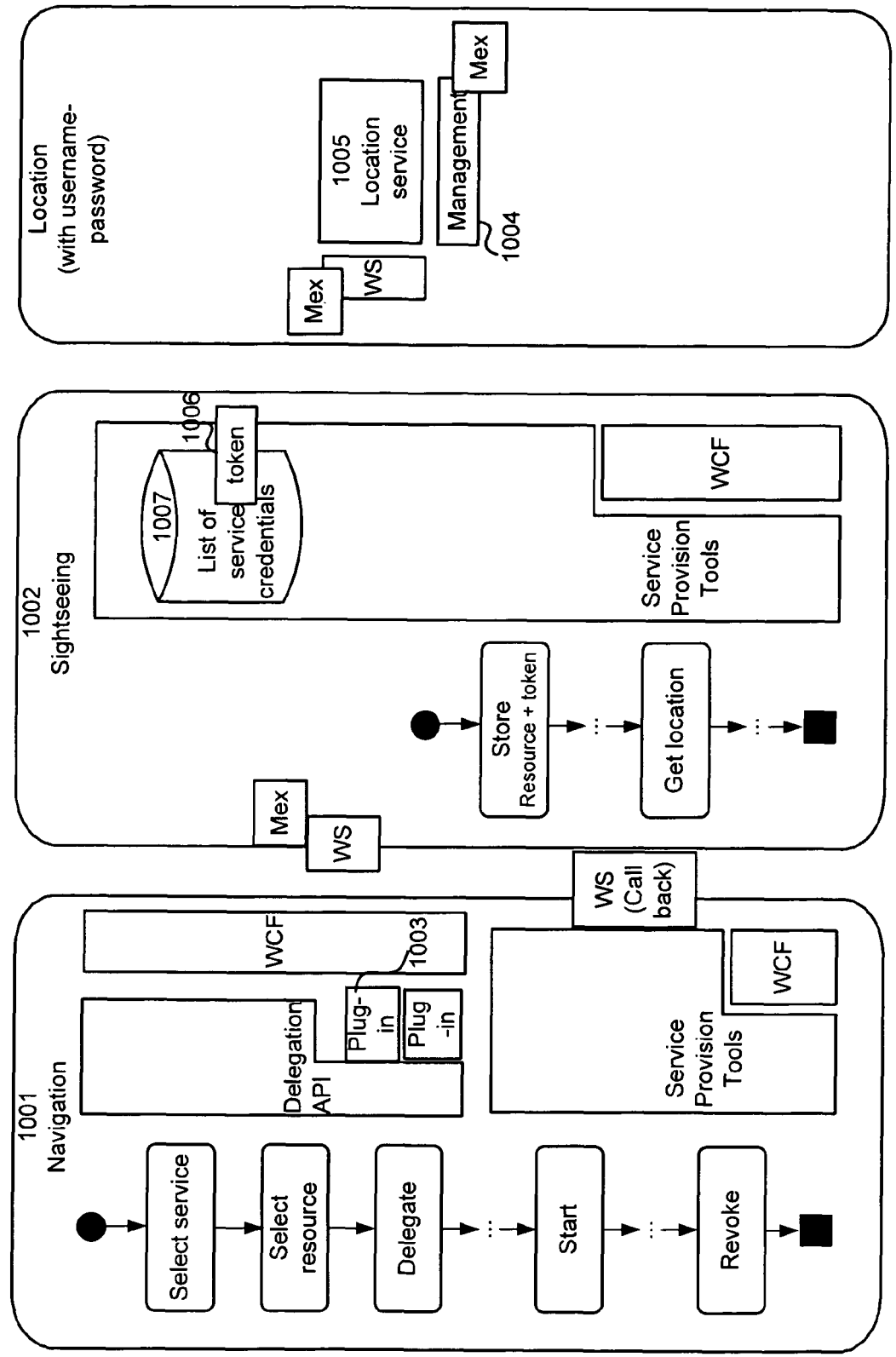

FIG. 10 shows a schematic diagram of another example delegation metasystem which may also be used to illustrate the navigation example described above. In this example, a different access control model is used in which a username and password is required to access the location service (as also shown in FIG. 7 and described above). The navigation system 1001 and the sightseeing service 1002 may be the same as those shown in FIG. 9, with the differences in operation being that a different plug-in 1003 is used to communicate with the management interface 1004 of the location service 1005 and different information 1006 is stored in the list of services and credentials 1007.

The examples above have used a sightseeing service as an example application of the methods and systems described. Another example application for systems and methods as described herein is for provision of medical records. In such an example, the initiator service may be a healthcare application, the composite service may be a hospital workflow and the resources required may include a medical record of a user and insurance service details for that user. In such an example, the method may proceed in a corresponding manner to that described above:

- the healthcare application accesses the requirements of the hospital workflow (as in block 202 of FIG. 2);
- the healthcare application selects resources to satisfy those requirements and this may require considerable filtering to identify those resources identified with a particular user that meet the applications needs (as in block 203);
- the healthcare application delegates access rights for the selected resources to the hospital workflow and receives back credentials for the hospital workflow (as in block 204);
- the healthcare application provides details of the resources and their associated credentials to the hospital workflow, which stores these details (as in blocks 205 and 206);
- the hospital workflow may verify that the resources and credentials are sufficient to satisfy its requirements (as in block 207);
- during execution of the hospital workflow, the selected resources are accessed and used as required (as in block 208); and
- on termination of the hospital workflow, the healthcare application revokes the access rights to the selected resources that it previously granted (as in blocks 209 and 210).

Where a number of different resources are identified that meet the requirements of the composite service, a choice may be offered to the user or alternatively the selection may be made automatically (e.g. based on defined criteria or preference flags associated with the resources). Where a choice is offered to a user, this may be via a delegation UI as described above and shown in FIGS. 3 and 4.

Whilst in the description above there is a clear distinction between the initiating service (the delegator) and the composite service (the delegatee), in some embodiments, the division may be less clear or there may be services which are acting both as delegator and delegatee. In an example of such a situation where the distinction is less clear, when registering in an hospital, a patient could give access to his medical record while the hospital could authorize the patient to use video on demand service from his room or enter some entertainment/sport shared room.

There are a number of data structures which may be used in the systems and methods described above. The following description provides an example structure and format for some of these data structures. Data types may be used to define service requirements (ServiceRequirements) of composite services, resource descriptions (Resource) for resource services, service references (ServiceReferences) for composite services (i.e. the pairs of resource details and credentials) as well as the metadata for the access control management of services (AccessControlManagement). The use of these data structures by the delegation API has already been described above with reference to FIGS. 6 and 7. The data structures described below make use of WS-* specifications and are serialized into XML elements when used in web service calls.

The following namespaces are used for defining the data types in the examples below, which are given in XML format.

| | |
|---|---|
| ds | http://www.w3.org/2000/09/xmldsig# |
| xenc | http://www.w3.org/2001/04/xmlenc# |
| wsse | http://docs.oasis-open.org/wss/2004/01/oasis-200401-wss-wssecurity-secext-1.0.xsd |
| wsu | http://docs.oasis-open.org/wss/2004/01/oasis-200401-wss-wssecurity-utility-1.0.xsd |
| wsa | http://www.w3.org/2005/08/addressing |
| wsaw | http://www.w3.org/2006/05/addressing/wsdl |
| wsp | http://schemas.xmlsoap.org/ws/2004/09/policy |
| sp | http://schemas.xmlsoap.org/ws/2005/07/securitypolicy |
| wfs | http://???/WorkflowSecurity |

The resource description may be used for two purposes, 1) to specify the requirements of the composite service and 2) to describe a resource. In an example implementation, resource description may contain a list of actions (i.e. qualified names) that identify a service as shown in the example data structure below. Resource descriptions may be used by the composite service to provide a list of services to which it needs access. At the initiator side (the side that delegates access rights) Service Provision Tools are used to do the mapping between the service requirements of the composite service and the available services that are described through resource descriptions.

```
(01)  <wfs:ResourceDescription>
(02)    <wsa:action>
(03)      http://???/WorkflowSecurity/Loc/getLoc
(04)    </wsa:action>
(05)    <wsa:action>
(06)      http://???/WorkflowSecurity/Loc/getLocAtTime
(07)    </wsa:action>
(08)  </wfs:ResourceDescription>
```

The composite service (which may also be referred to as the 'delegate') data structure provides the identity of the service to which access rights will be delegated. It can be represented in a number of ways such as an X.509 certificate as or an alias (e.g. username, e-mail address). The composite service data structure can be obtained from the metadata of the composite service or through an external service e.g. Active Directory. The composite service data structure is used by the Delegation API. In a first example composite data structure, the composite service can be represented by an X.509 certificate:

```
(01)  <wfs:Delegatee>
(02)    <wsse:BinarySecurityToken wsu:Id="binarytoken"
        ValueType="wsse:X509v3"
        EncodingType="wsse:Base64Binary">
        MIIEZzCCA9CgAwIBAgIQEmtJZc0...
(03)    </wsse:BinarySecurityToken>
(04)  </wfs:Delegatee>
```

In a second example composite data structure, the composite service may be represented as an alias (e.g. username, e-mail address):

```
(01) <wfs:Delegatee>
(02)   <wsse:Username>EUROPE\Bob</wsse:Username>
(03) </wfs: Delegatee>
```

The Resource data structure may be defined as wsp:AppliesTo. The endpoint reference contains the address on which the service can be contacted. Further it may contain a Resource Description with a list of actions that can be invoked on the service. Optionally, properties such as quality of service, trust policies, etc. may also be defined. Those parameters are used for the selection of the appropriate resource based on the service requirements of the composite service. The Delegation API matches the actions provided in the resource with the service requirements of the composite service (e.g. as described above). For this it may also consider additional parameters such as quality of service, if they are specified. For example a composite service may require access to a real-time position of the user with a precision of 100 m. Therefore a resource service has to be picked that satisfies this requirement. After a successful match, the delegation uses the information in the resource to enable access to the requested actions. After delegation, the Delegation API adds the user to the resource. The resource will be provided to the composite service. It will use it to access the resource service in order to obtain the current location of the particular user. In an example, the resource data structure may comprise:

```
(01)  <wsp:AppliesTo>
(02)    <wsa:EndpointReference>
(03)      <wsa:address>
(04)        http://www.fabrikam.com/LocationService
(05)      </wsa:address>
(06)      <wsa:ReferenceProperties>
(07)        <wfs:ResourceDescription>
(08)          <wsa:action>
(09)            http://???/WorkflowSecurity/Loc/getLoc
(10)          </wsa:action>
(11)        </wfs:ResourceDescription>
(12)        <wfs:QoS>
(13)          <wfs:locQoS>
(14)            http://???/WorkflowSecurity/Loc/silver
(15)          </wfs:locQoS>
(16)        </wfs:QoS>
(17)        <wfs:User>Bob@contoso.com</wfs:User>
(18)      </wsa:ReferenceProperties>
(19)    </wsa:EndpointReference>
(20)  </wsp:AppliesTo>
```

The Service Reference data structure may contain a resource and key material to access this resource. Service references are stored in the "Service List" and can be queried. The key material may be either a reference (e.g. to a X.509 thumbprint), when key material to be used by the composite service is already known, or one or more security tokens. The Service Reference data structure may be implemented as a Request Security Token Response (RSTR).

Service requirements may be specified as a list of resource descriptions as shown below. In further examples, constraints such as trust policy, QoS (Quality of Service), supported mechanisms, etc. may be added. Those constraints describe the service requirements and are used by the initiator service to choose the right resource. The composite service uses service requirements to communicate its needs to the initiator service. An example of such service requirements may comprise:

```
(01)  <mex:MetadataSection>
(02)    <wfs:ServiceRequirements>
(03)      <wfs:ResourceDescription>
```

```
(04)        <wsa:action>
(05)          http://???/WorkflowSecurity/Loc/getLoc
(06)        </wsa:action>
(07)        <wsa:action>
(08)          http://???/WorkflowSecurity/Loc/getLocAtTime
(09)        </wsa:action>
(10)      </wfs:ResourceDescription>
(11)      <wfs:ResourceDescription> ... </wfs:ResourceDescription>
(12)    </wfs:ServiceRequirements>
(13)  </mex:MetadataSection>
```

In addition to the data structures and metadata described above, there may be metadata associated with resources to simplify the selection of the right plug-in in the Delegation API. When such metadata is not available, another mechanism, e.g. a configuration file, may be provided to find an appropriate plug-in to manage access to a specific resource.

The system described herein maps the generic delegation of access rights at design time to the concrete access control model at runtime. In order to achieve that, the initiator service (that delegates the rights) learns at runtime what kind of access control (AC) is used by the resource service selected. This information may be expressed in management metadata that are defined in the Service Access Management data type. The content is different depending on the AC model and this is described in more detail below.

When access control is based on STS, e.g. the modification of an access control list (ACL) at the STS, the service has to expose this information through management metadata. An example of management metadata exposed by a service which access control is based on STS comprises:

```
(01)  <mex:MetadataSection>
(02)    <wfs:ServiceAccessManagement>
(03)      <wfs:ServiceAccessManagement_ACLX509>
(04)        <wsa:address>
(05)          <!-- address of sts management -->
(06)          http://www.fabrikam.com:7000/sample/trust/mgmt/mex
(07)        </wsa:address>
(08)        <wfs:ManagementInterface>
(09)          <QName>wfs:IMgmt</QName>
(10)        </wfs:ManagementInterface>
(11)      </wfs:ServiceAccessManagement_ACLX509>
(12)    </wfs: ServiceAccessManagement>
(13)  </mex:MetadataSection>
```

The STS management metadata defines the endpoint address where the metadata of the STS is accessible as well as the management interface implemented by the STS. On the endpoint, the STS exposes metadata that describe how to authenticate configure access via the ACL as shown below:

```
(01)  <mex:MetadataSection>
(02)    <wsp:Policy wsu:Id="CustomBinding_IMgmt_policy"> ... </wsp:Policy>
(03)    <wsp:Policy
(04)  wsu:Id="CustomBinding_IMgmt_AddAuthorizedUser_Input_policy">
(05)      ...
(06)    </wsp:Policy>
(07)    ...
(08)    <wsdl:portType name="IMgmt"> ... </wsdl:portType>
(09)    <wsdl:binding name="CustomBinding_IMgmt" type="wfs:IMgmt">
(10)      ...
(11)    </wsdl:binding>
(12)    <wsdl:service name="ManagementService">
(13)      <wsdl:port
(14)        name="CustomBinding_IMgmt"
(15)        binding="wfs:CustomBinding_IMgmt">
(16)        <wsa10:EndpointReference>
(17)          <wsa10:Address>
(18)            http://www.fabrikam.com:7000/sample/trust/mgmt
(19)          </wsa10:Address>
(20)        </wsa10:EndpointReference>
(21)      </wsdl:port>
(22)    </wsdl:service>
(23)  </mex:MetadataSection>
```

When the access to a service is protected with username and password, the access control decision is done at the service. The service therefore offers a management interface on which, for example, a new user account can be created. This information has to be exposed in management metadata. The Service Access Management contains an address and the interface type of the management. The address points to the endpoint exposing the management interface for creation of new user accounts. An example of the metadata of the service comprises:

```
(01)  <mex:MetadataSection>
(02)    <wfs:ServiceAccessManagement>
(03)      <wfs:ServiceAccessManagement_usernamePassword>
(04)        <wsa:address>
(05)          <!-- address of service management -->
(06)          http://www.fabrikam.com:4127/LocationService/mgmt/mex
(07)        </wsa:address>
(08)        <wfs:ManagementInterface>
(09)          <QName>wfs:IMgmt</QName>
(10)        </wfs:ManagementInterface>
(11)      <wfs:ServiceAccessManagement_ACLX509>
(12)    </wfs:ServiceAccessManagement>
(13)  </mex:MetadataSection>
```

An example of the metadata of service management comprises:

```
(01)  <mex:MetadataSection>
(02)    <wsp:Policy wsu:Id="CustomBinding_IMgmt2_policy"> ... </wsp:Policy>
(03)    <wsp:Policy
(04)  wsu:Id="CustomBinding_IMgmt2_AddAuthorizedUser_Input_policy">
(05)      ...
(06)    </wsp:Policy>
(07)    ...
(08)    <wsdl:portType name="IMgmt2"> ... </wsdl:portType>
(09)    <wsdl:binding name="CustomBinding_IMgmt2" type="wfs:IMgmt">
(10)      ...
(11)    </wsdl:binding>
(12)    <wsdl:service name="ManagementService">
(13)      <wsdl:port
(14)        name="CustomBinding_IMgmt2"
(15)        binding="wfs:CustomBinding_IMgmt2">
(16)        <wsa10:EndpointReference>
(17)          <wsa10:Address>
(18)            http://www.fabrikam.com:4127/LocationService/mgmt
(19)          </wsa10:Address>
(20)        </wsa10:EndpointReference>
(21)      </wsdl:port>
(22)    </wsdl:service>
(23)  </mex:MetadataSection>
```

When the access control model is based on a chain of credentials (e.g. SecPAL), the service's management metadata identifies this type of access control. In this case, there is no web service invocation to create the security token. The initiator (that delegates the rights) has to know how to create new credentials. A local library or Certification Authority can be used for this purpose. In this example, the metadata of the service may comprise:

```
(01)    <mex:MetadataSection>
(02)     <wfs:ServiceAccessManagement>
(03)      <ServiceAccessManagement_ChainSecPAL/>
(04)     </wfs: ServiceAccessManagement>
(05)    </mex:MetadataSection>
```

Figure 11:
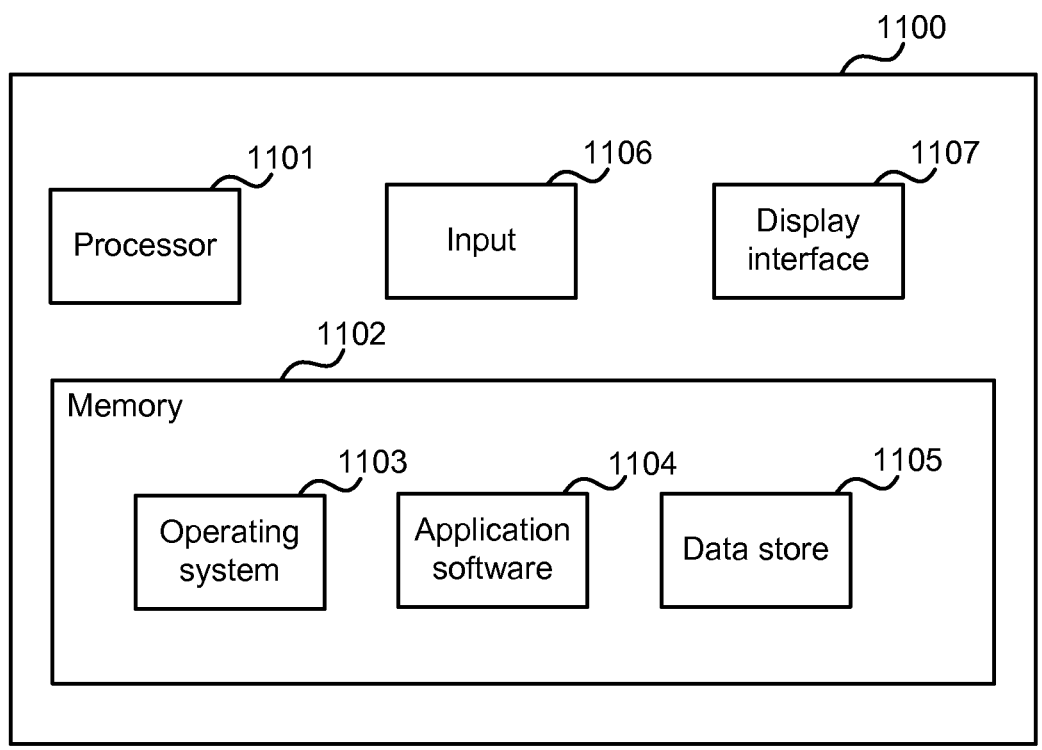
FIG. 11 illustrates an exemplary computing-based device in which embodiments of the methods described herein may be implemented.

FIG. 11 illustrates various components of an exemplary computing-based device 1100 which may be implemented as any form of a computing and/or electronic device, and in which embodiments of the methods and systems described above may be implemented. This exemplary computing-based device may be used to run the initiator application, the composite service, a resource or any combination thereof.

Computing-based device 1100 comprises one or more processors 1101 which may be microprocessors, controllers or any other suitable type of processors for processing computing executable instructions to control the operation of the device in order to perform any aspects of the methods described above. Platform software comprising an operating system 1103 or any other suitable platform software may be provided at the computing-based device to enable application software 1104 to be executed on the device.

The computer executable instructions may be provided using any computer-readable media, such as memory 1102. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 1102 may also comprise a data store 1105 which may be used to store the credentials and resource information where the device is operating a composite service. The data store 1105 may be used to store metadata, such as resource or composite service metadata, dependent on the use of the device 1100.

The computing-based device 1100 further comprises one or more inputs 1106 which are of any suitable type for receiving media content, Internet Protocol (IP) input etc. The device may also comprise a communication interface (not shown in FIG. 11). An output may be provided (not shown in FIG. 11).

The computing-based device 1100 further comprises a display interface 1107, which may provide an audio and/or video output to a display system integral with or in communication with the computing-based device 1100. The display system may provide a graphical user interface or other user interface of any suitable type although this is not essential. In an example, the display interface 1107 may output data to cause the delegation UI (described above) to be displayed on a display.

Although the present examples are described and illustrated herein as being implemented in a system as shown in FIG. 11, the system described is provided as an example and not a limitation. As those skilled in the art will appreciate, the present examples are suitable for application in a variety of different types of systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computing device to provide a composite service, the computing device comprising:
   one or more processors;
   memory; and
   a plurality of generic resource descriptions stored in the memory, including service requirements for the composite service, and wherein the generic resource descriptions are mapped to available resources at runtime based at least in part on the service requirements for the composite service, the available resources comprising metadata, the metadata comprising at least one of: data identifying an access control model associated with the resource and a management endpoint for the resource, and a dependency between a user of the composite service and at least one of the available resources;

the one or more processors being configured to select one plug-in of a first plurality of plug-ins different from a second plurality of plug-ins, selection of one of the second plurality of plug-ins being part of a delegation of access rights to the composite service for at least one available resource, based at least in part on credentials for the at least one available service provided to the composite service.

2. A computing device to provide a composite service according to claim 1, wherein the plurality of generic resource descriptions is included within metadata associated with the composite service.

3. A computing device to provide a composite service according to claim 2, wherein the metadata further comprises identity information for the composite service.

4. A computing device to provide a composite service according to claim 1, further comprising a plurality of plug-ins, wherein each of the plurality of plug-ins corresponds to an access control model.

5. A computing device to provide a composite service according to claim 4, further comprising a service provision module associated with the plurality of plug-ins, and arranged to select one of the plurality of plug-ins at runtime based at least in part on a verified credential for an available resource.

6. A computing device to provide a composite service according to claim 1, further comprising a module arranged to verify credentials received for an available resource.

7. A computing device to provide a composite service according to claim 1, further comprising a data store arranged to store credentials received for an available resource.

8. A computing device to provide a composite service according to claim 1, arranged:
to receive credentials associated with an available resource; and
on invocation of the composite service, to use the credentials to access the available resource.

9. A method of initiating a composite service comprising:
at a runtime;
accessing generic service requirements for the composite service;
mapping the generic service requirements to at least one available service having an access control model, the access control model being associated with a plurality of available resources comprising metadata, the metadata comprising at least one of: data identifying an access control model associated with the resource and a management endpoint for the resource;
delegating access rights to the composite service for the at least one available service comprising, selecting one plug-in, of a first plurality of plug-ins, corresponding to the access control model of the at least one available service; and
providing credentials for the at least one available service to the composite service for the composite service to select one plug-in, of a second plurality of plug-ins different from the first plurality of plug-ins, based at least in part on the provided credentials.

10. A method according to claim 9, wherein accessing generic service requirements comprises:
accessing metadata associated with the composite service, the metadata comprising the generic service requirements and identity data for the composite service.

11. A method according to claim 9, wherein mapping the generic service requirements to at least one available service comprises:
accessing metadata associated with each of a plurality of available services; and
mapping the generic requirements to at least one of the plurality of available services based on at least the metadata.

12. A method according to claim 9, further comprising using the selected one of the plurality of plug-ins to communicate with the at least one available service.

13. A method according to claim 9, further comprising:
on termination of the composite service; revoking the access rights.

14. A delegation metasystem comprising:
one or more processors;
memory;
a composite service comprising a first set of plug-ins associated with different access control models, each of the access control models being associated with an available resource of a plurality of available resources, the composite service arranged to:
receive a credential from a delegation module for at least one available resource of the plurality of available resources;
select a plug-in at runtime from the first set of plug-ins based at least in part on the received credential; and
access, via the plug-in selected at runtime from the first set of plug-ins, the at least one available resource at runtime to execute the composite service;
a resource mapping application, stored in the memory, having computer executable instructions that when executed by the one or more processors is arranged to map generic resource requirements of the composite service to at least one available resource of the plurality of available resources at runtime, the plurality of available resources comprising metadata, the metadata comprising at least one of: data identifying an access control model associated with the resource and a management endpoint for the resource;
a second set of plug-ins, different from the first set of plug-ins, and associated with the different access control models associated with the available resources;
wherein the delegation module is arranged to delegate access rights for the at least one available resource to the composite service at runtime using a plug-in selected at runtime from the second set of plug-ins, and
wherein the plug-in selected at runtime from the second set of plug-ins corresponds to the access control model associated with the at least one available resource and is used to communicate with the at least one available resource.

15. A delegation metasystem according to claim 14, wherein the composite service comprises:
a composite service application arranged to receive an identifier and a credential for each of the at least one available resources; and
a service provision module arranged to access the at least one available resource using the identifier and credential and the plug-in selected from the first set of plug-ins, wherein the plug-in selected from the first set of plug-ins corresponds to the access control model associated with the at least one available resource.

16. A delegation metasystem according to claim 14, wherein the delegation module is further arranged to revoke access rights for the at least one available resource to the composite service using one of the plurality of plug-ins on termination of the composite service.

\* \* \* \* \*